United States Patent
Graves

[15] 3,691,505
[45] Sept. 12, 1972

[54] HEATER CABLE SPLICE AND METHOD OF FORMING

[72] Inventor: Ralph L. Graves, East Greenwich, R.I.

[73] Assignee: General Electric Company

[22] Filed: Aug. 20, 1970

[21] Appl. No.: 65,532

Related U.S. Application Data

[63] Continuation-in-part of Ser. No. 733,369, May 31, 1968, abandoned.

[52] U.S. Cl............338/214, 174/DIG. 8, 174/84 R, 174/88 R, 219/528, 219/541, 338/274, 29/628, 29/619
[51] Int. Cl..........................H01c 3/00, H02g 15/08
[58] Field of Search....174/74 A, DIG. 8, 84 R, 88 R, 174/88 C; 219/528, 541; 338/214, 274, 273, 276, 226; 29/628, 610, 619

[56]            References Cited
           UNITED STATES PATENTS 3,243,211  3/1966  Wetmore..........174/DIG. 8 X
3,387,364  6/1968  Boggs...................174/84 R X Primary Examiner—Darrell L. Clay
Attorney—Paul E. Rochford, Joseph B. Forman, Frank L. Neuhauser and Oscar B. Waddell

[57]            ABSTRACT

Moisture resistant splicing of heater cable for subsoil or other high moisture installation and use is provided by progressively exposing the lengths of the surfaces of the superposed layers of the ends of cables to be spliced, electrically engaging the current carrying conductors, applying a semi-cured vulcanizable insulation layer about the conductors, to contact sections of the surfaces of exposed layers, heat shrinking a two layer shrink tube as an outer jacket of the splice and simultaneously heating and compressing the semi-cured vulcanizable insulating layer to partially fuse the layer and to bond the layer to the exposed surfaces.

3 Claims, 13 Drawing Figures

INVENTOR.
RALPH L. GRAVES
BY Paul E. Rockford
ATTORNEY

INVENTOR.
RALPH L. GRAVES
BY Paul E. Rochford
ATTORNEY

HEATER CABLE SPLICE AND METHOD OF FORMING

This is a continuation-in-part of application, Ser. No. 733,369 filed May 31, 1968.

The present invention relates to a moisture resistant heater cable splice and to the method of forming it. More particularly it relates to a splice usable with a heater cable for installation in moist or wet environments and in those which have relatively low heat transfer properties.

In applications of heater cable to underground installation, the need for an underground moisture resistant or waterproof seal or splice between the heater cable and the cable supplying the power is evident.

Illustrations of such installation and heater cable splices includes soil heating, installation in asphalt of concrete, heating of pipes and roof de-icing.

Also, for splices used above ground, exposure to rain and snow particularly in roof de-icing, necessitates moisture resistant splices.

Whether a splice is to be located in air or underground, the problem of sealing the splice against the entry of water or moisture is similar in that heat cycling and use over an extended period of time can induce openings into the splice so that moisture or water can gain access to the conductors to develop current leakage paths through the insulation.

Further the structure of the heater cable and that of the non-heating cable makes the splice difficult because of the dissimilarity of the materials of the several layers particularly the diverse layers of a lead sheathed heater cable having an inner insulating layer composed at least partly of asbestos fibers.

Individually the layers of material in the heater cable may be relatively thin and difficult to accommodate into a splice. Cumulatively as the layers can be relatively thick so that the splice of a heater cable to a power supply cable can be one between two cables of substantially different diameters. Some of the layers themselves are relatively thin and may be on the order of 20 or 30 mils, as for example, in the case of the outer insulating jacket of a lead sheathed heater cable. A problem of forming a seal and maintaining the integrity of the outer jacket to exclude moisture or water is accordingly presented.

Another significant problem in splicing the heater cable and the power feed cable is the relative weakness of the heater element of a heater cable by itself. That is, as the outer layers of material are removed from the heater cable in order to expose and make contact with the heater element which will receive the current, the strength of the cable surrounding this inner heater element is greatly reduced. For example, the actual strength may be reduced to one-fourth to one-sixth of the original strength as for example in a case where the breaking load of the heater element itself is of the order of 15 pounds and that of the cable of the order of 80 pounds. The problem accordingly is not only to provide a waterproof or moisture-proof seal extending from the outer jacket of the heater cable to the outer jacket of the power cable but is also to provide sufficient strength between these two cables so that the breakage under stress does not occur in the area of this splice. Desirably a splice should exceed the minimum breaking load of either the power cable or the heater cable which are spliced together.

Where the strength of the weaker of the two cables is not exceeded, a strength of the splice in excess of two thirds that of the weaker cable is sought.

In most of these splice constructions the heater cable, particularly the lead of the heater cable, is the weaker element and the means for reinforcing this element can be critical to the overall strength of the seal.

It is accordingly one object of the present invention to provide a low cost highly reliable splice for heater cable.

Another object is to provide a heater cable splice capable of excluding moisture.

A further object of the present invention is to provide a heater cable splice having good heat transfer capabilities.

Still another object of the present invention is to provide a splice adaptable to the splicing of a variety of heater cable constructions to other heater cables or to power supplying cables.

An additional object of the present invention is the provision of a method of forming splices having superior properties.

Other objects will be in part apparent and in part pointed out in the description of the invention and how it may be carried into effect which follows.

In one of its broader aspects, the objects of the present invention are carried out by exposing lengths of surfaces of inner layers of the cable ends to be spliced, electrically engaging the current carrying conductors, applying a layer of semi-cured, vulcanizable insulation about the conductors and onto the exposed surfaces of inner cable layers, heat shrinking a tube having an outer heat shrinkable layer and an inner fusible layer into contact with the semi-cured vulcanizable insulation and heating said vulcanizable insulation to at least partially fuse it and bond it to the inner layer of said dual layer shrink tube.

A clearer understanding of this description will be gained by reference to the accompanying drawings in which.

Figure 1:
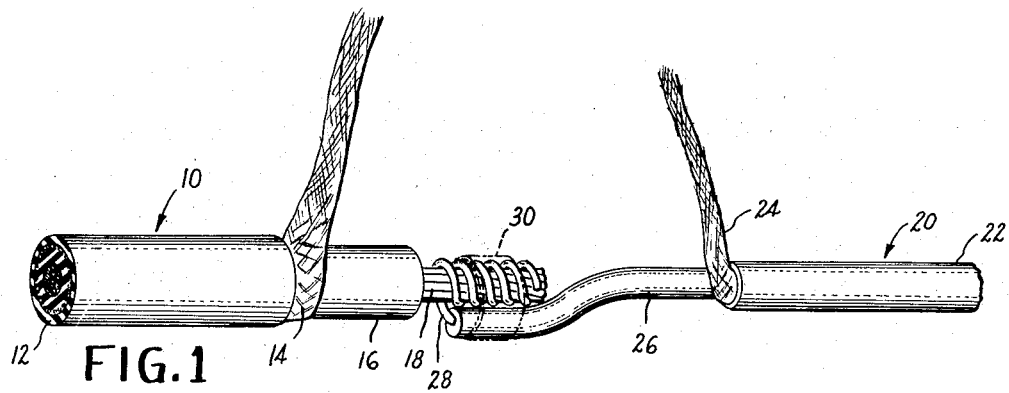
FIG. 1 is a perspective view of two confronting cable ends having layers exposed and conductors engaged preparatory to splicing.

Referring first to FIG. 1, there is shown on the left hand side a power supply cable 10 having an outer insulating jacket 12, and a grounding braid 14 woven about an inner insulation layer 16. The inner insulating layer 16 encloses a stranded copper conductor 18 which can furnish electric power to a heater cable to which the power supply cable 10 is spliced in accordance with this invention.

A heater cable 20 is shown at the right hand side of FIG. 1 and includes an outer insulator jacket 22 and an inner grounding braid 24 which is formed about an inner insulating layer 26. A resistance or heating conductor 28 forms the innermost of the elements of the heater cable 20.

Figure 5:
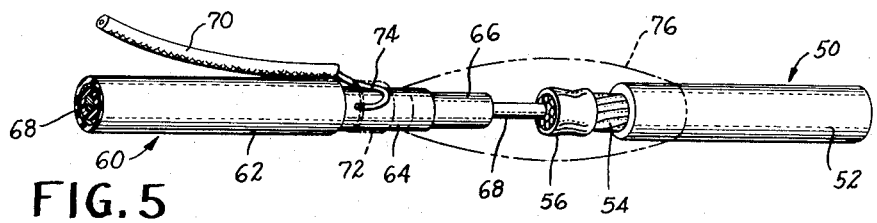
FIG. 5 is a perspective view of a pair of confronting cable ends with layers exposed for application of insulation shown in phantom.

The splice may be formed by winding the end of the exposed heater cable wire about the exposed power supply conductor 18 so that both conductors extend in the same direction. Alternatively the conductor ends may be joined as shown in FIG. 5. In the form shown in FIG. 1, the heater cable is aligned parallel to the power supply cable with an insulated portion of the power supply conductor 18. A collar clamp or metal band 30 is pressed into place about the cable ends to hold the conductor 28 firmly against conductor 30. While either form of joining conductors may be employed, that shown in FIG. 1 is preferred where a strain relief holding of the insulated end of heater cable 20 against conductors 18 is desired. Clamping of heater cable insulation against the heater element is only used where the insulation is high melting and has good thermal stability.

Figure 2:
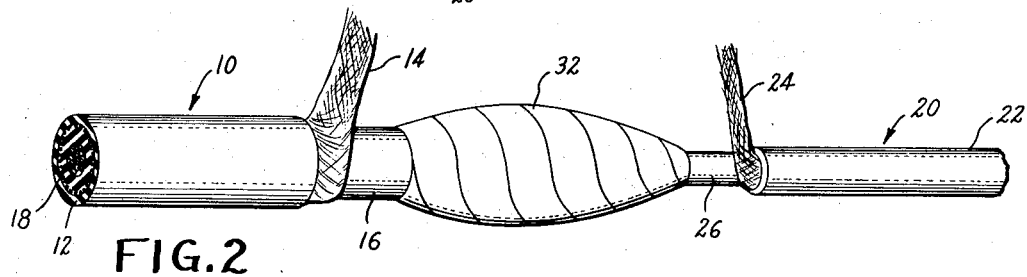
FIG. 2 is a similar view of the cables of FIG. 1 showing a layer of insulation wrapped about the inner conductors.

The next stage in the preparation of the splice is shown in FIG. 2 where a wrapping 32 of numerous layers of a partially cured butyl rubber tape is shown. The other parts of the structure, bearing numbers corresponding to those of FIG. 1, concern parts as described in FIG. 1 and their description is not repeated here.

It will be seen that the winding of tape 32 extends from its contact with the outer surface of the inner insulating layer 16 to the outer surface of the inner insulating layer 26 of the heater cable 20. No heat is applied in forming this layer but the heat applied at a later stage can cause a fusion and further curing of the partially cured butyl composition of the layer.

Figure 3:
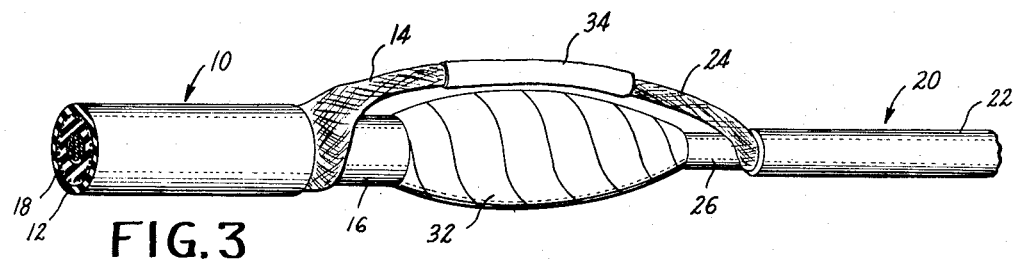
FIG. 3 is a similar view of a later stage of splicing of the same cable ends as seen in FIG. 2 with grounding braid joined and sheathed with an insulating spacer.

Turning now to FIG. 3, the next stage in the preparation of the splice is also shown. Again, the reference numbers used in FIG. 3 for parts are for parts essentially the same as those shown and described in FIGS. 1 and 2 and the above description applies to the referenced parts in FIG. 3.

As evident from FIG. 3, the grounding braids 14 and 24 are joined on the outside of the wrapping 32 of insulating tape and are provided with a clamp similar to collar clamp 30 of FIG. 1 and are also provided with an insulating sleeve 34 extending over those portions of the grounding braids 14 and 24 which are proximate the conductors within the wrapping 32. This sleeve 34 provides an added protection against the grounding of the conductor 18 or 28 to the grounding braids of the respective cables 10 and 20 even where the spliced braids are pressed into the layer 32 as a shrink tube is heat shrunk into place about the layer 32 and outer layer described below.

An outer winding of semi-cured butyl rubber tape is then formed over the combined inner layer 32 plus the braids 14 and 24 and the sleeves 34.

Figure 4:
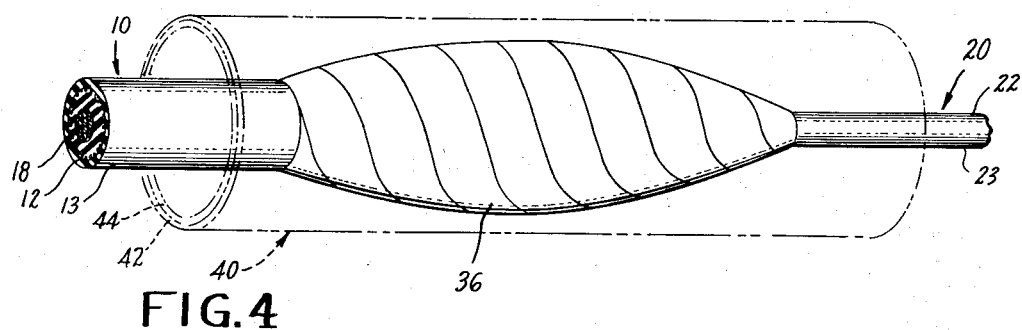
FIG. 4 is a similar view of a later stage of splicing showing a second layer of insulation in place and showing a two layer shrink tube in phantom in position to be shrunk onto the splice.

Turning now to FIG. 4, the next stage in the development of the splice is depicted. As seen, a second and outer wrapping of semi-cured butyl rubber tape is wound over the combined grounding braids and inner wrapping of butyl rubber tape and extends from the outer surface 13 of the conductor 10 to the outer surface 23 of the heater cable 22.

This splice structure including tape wrapping layer 36 and adjoining sections of cables is then enclosed within a dual layer shrink tube 40, the outer layer 42 of which is formed of a partially cross-linked polyolefin having a relatively higher melting point and the inner layer 44 which is formed of a lower melting polyolefin. The inner and outer layers are joined to form a dual layer structure such that the temperature which melts the inner layer also causes the heat shrinking of the outer layer.

Figure 8:
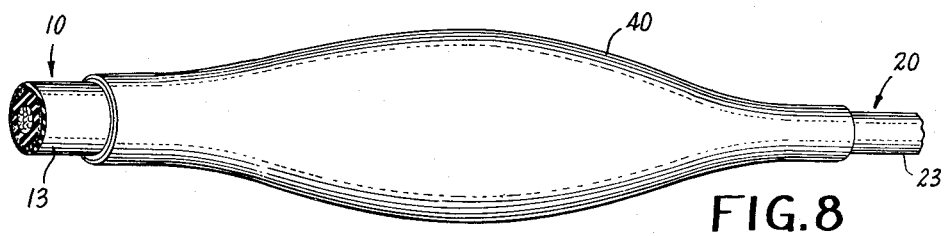
FIG. 8 is a similar view of the completed splice of the form shown in FIGS. 1 – 4.

By applying heat, as for example by blowing hot air over the exterior surface of the shrink tube, the tube is caused to shrink because of the shrink properties or memory of the material of the external of the two layers of the dual layer tube. At the same time the inner layer is fused by the same heating which causes shrinking of the outer layer. Consequently, the shrink tube shrinks as shown in FIG. 8 into conformity with the external surfaces 13 and 23 of the two cables 10 and 20 as well as into a compressive grip about the layer of semi-cured butyl rubber tape 36.

Turning now to FIG. 5, a pair of cable ends are shown confronting each other in a splice arrangement which is designed to provide a splice between a current carrying cable 50 and a heater cable 60. It will be understood that the splice of the present invention can be formed equally well between two heater cable ends with equal facility and reliability. The current carrying cable on the right has an outer insulation of suitable material for direct burial in the ground. This outer insulation covers a stranded copper conductor 54 which furnishes power to the heater cable. A clamp 56 is used to hold the single conductor 68 of the heater cable in electrical contact with the strands of the power supply cable 50. The heater cable itself is formed with an outer insulating jacket 62 which is disposed over an inner lead sheath 64. The lead sheath is in turn formed over an inner insulating layer 66 which encloses the innermost conductive elements 68. The inner insulation layer 66 may be formed of a cross-linked polyolefin such as cross-linked polyethylene either filled or unfilled and may be overlain with strands of asbestos fiber to prevent scorching as the lead layer is deposited thereupon.

The lead layer 64 serves both as a heat transfer layer and as a grounding layer for the heater cables 60. In order to carry the ground to an appropriate grounding electrode for drainage of grounding current from the lead sheath, a grounding conductor 70 is provided and is clamped on to the lead sheath 64 by the clamp 72 which is shown in phantom in FIG. 5 and which overlays the bared end of the conductor 74 of the grounding cable 70.

Figure 9:
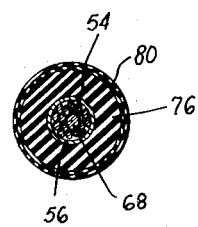
FIG. 9 is a cross-sectional view of the structure shown in FIG. 7 taken along the line 9—9 of FIG. 7.

A wrapping of numerous strands of a partially cured insulating butyl rubber tape is formed in the general outline shown as 76 in FIG. 5 and, as will be seen, extends from the exposed surface of the lead sheath layer 64 to the outer surface 52 of the power supply cable 50. The winding of the tape on the splice is similar to that described with reference to FIG. 2 and its form is more evident in the illustration of FIG. 6 and the cross section shown in FIG. 9.

Figure 6:
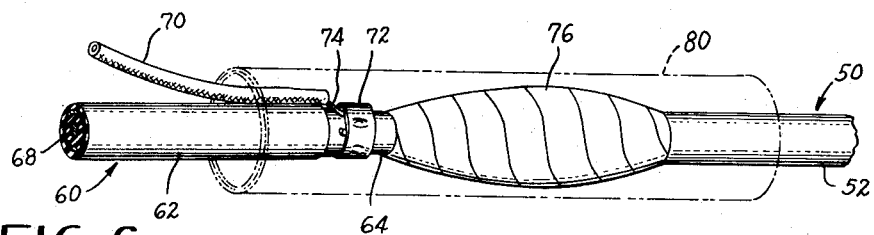
FIG. 6 is a similar view of the cable ends with a shrink tube shown in phantom.

Referring next to FIG. 6, the like numbers on like parts are meant to indicate the structural elements described with reference to FIG. 5 and for purposes of clarity, a number of the reference numerals are omitted so that the relationship between the shrink tube shown in phantom in FIG. 6 and the elements of the splice are more evident. As will be seen, the shrink tube 80 shown in phantom extends beyond to a degree which permits the inner surface of the dual layer shrink tube 80 to come into tight contact with the outer insulating layer 52 of cable 50 and with the outer insulating layer 62 of cable 60. The insulating layer of grounding wire 70 is also held in place by the tight shrinking of the tube about it.

The moisture excluding properties of the layer 76 are controlling in excluding moisture from the power supply conductor 54 and the heater conductor 68 and, even though moisture may be admitted to the grounding connection at 72, an effective moisture excluding bond is formed between the butyl layer 76 and the outer layer 52 of the conductor 50 as well as between the outer surface of the lead sheath 64 and the butyl layer 76.

Figure 7:
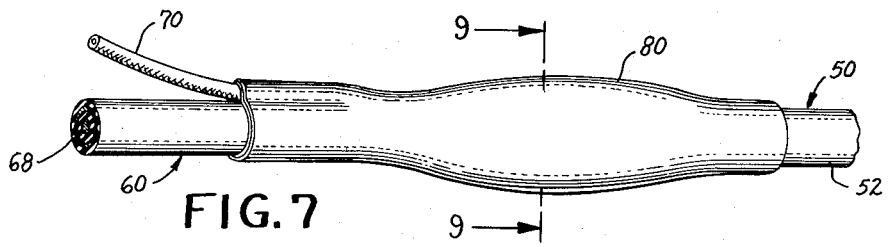
FIG. 7 is a similar view of the completed splice with the outer shrink tube shrunk into place.

When the shrink tube is shrunk into place and the insulating layer is compressed and heated, the final contour of the splice is that shown in FIG. 7. Again, a very effective moisture excluding construction is shown which is as strong as, or stronger than, the other portions of the cable for which it provides the joining splice.

Referring now to FIGS. 10 through 13 the reference numbers used in describing the splices of FIGS. 1 through 9 are agains used to designate parts essentially the same as those shown in these earlier figures.

Figure 10:
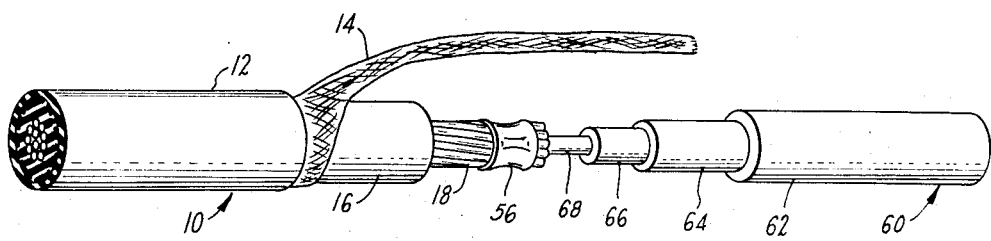
FIG. 10 is a perspective view similar to that of FIG. 5 but having a braided power supply cable.

Referring first to FIG. 10 there is shown on the left hand side a power supply cable 10 having an outer insulating jacket 12 and a grounding braid 14 woven about an inner insulation layer 16. The inner insulating layer 16 encloses a stranded copper conductor 18 which can furnish electric power to a heater cable to which the power supply cable 10 is spliced in accordance with this invention.

A heater cable 60 shown at the right of FIG. 10 is essentially the same as heater cable 60 on the left hand side of FIG. 5. It is formed with an outer insulating jacket 62 disposed over an inner lead sheath 64. The lead sheath is in turn formed over an inner insulating layer 66 which encloses the innermost conductive heater element 68 and may be formed of cross-linked polyolefin as described above.

The conductive strands 18 of power supply 10 are electrically and mechanically linked to the heater element 68 by collar clamp 56.

The linked inner conductors are overlaid with a wrapping of many layers of a partially cured butyl rubber tape to embed the clamped conductors 18 and 68 and to partially cover the exposed surfaces of insulation layers 16 and 66 respectively The inner layer of insulation 76 accordingly extends between inner insulator 16 and inner insulator 66.

Figure 11:
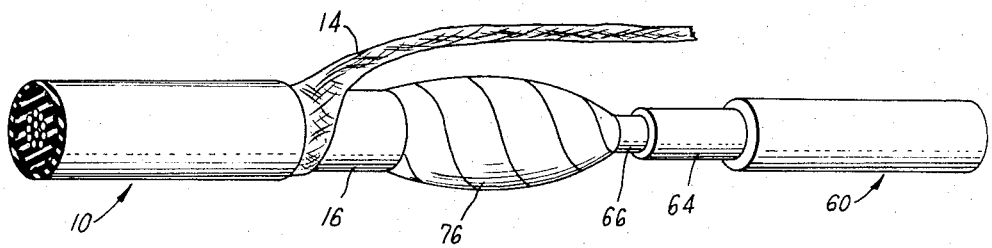
FIG. 11 is a view similar to that of FIG. 10 but showing a layer of insulation wrapped about the inner conductors.
Figure 12:
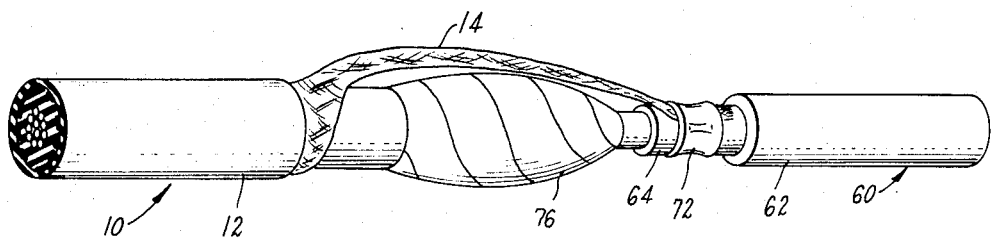
FIG. 12 is a view similar to that of FIG. 11 with the grounding braid of one cable clamped to the grounding sheath of the other.
Figure 13:
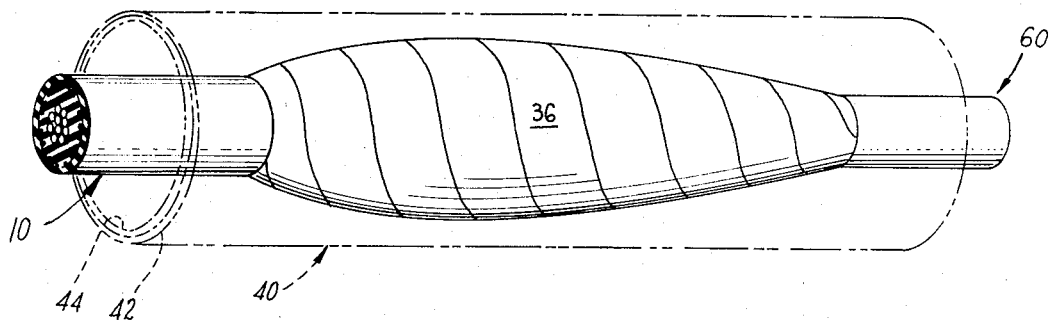
FIG. 13 is another view of the same splice after an outer layer of insulation has been applied and showing a shrink tube poised in place in phantom prior to shrinking.

The braid 14 of power supply cable 16 is extended over the inner insulating layer 76 as shown in FIG. 11 and its end is crimped into electrical and mechanical engagement with lead sheath 64 by the collar 72, as shown in FIG. 12. A sleeve may be included over the braid 14 as taught in the description relating to FIG. 3 above but is not shown in FIG. 12.

An outer layer of insulation 36 is formed over the inner layer 76 and exposed braid 14, sheath 64 and collar 72 by wrapping numerous layers of partially cured butyl rubber tape to extend from outer insulating layer 12 of power supply cable 10 to outer insulating layer 62 of heater cable 60.

This splice structure including tape wrapping layer 36 and adjoining sections of cables is then enclosed within a dual layer shrink tube 40.

The outer layer 42 of which is formed of a partially cross-linked polyolefin having a relatively higher melting point and an inner layer 44 which is formed of a lower melting polyolefin. The shrink tube has the structure and characteristics described with reference to FIG. 4 above. The shrink tube 40 is heat shrunk into compressing contact with insulating layer 36 and the adjoining portions of the outer insulating layers of the cables 10 and 60 as also described above with reference to FIG. 4 to form a finished insulated splice structure essentially as shown in FIG. 8.

One of the unique features of the splicing method of this invention is the emphasis which is placed on heating and compressing the semi-cured butyl rubber to bond the inner surfaces of the butyl rubber layer to any and all exposed surfaces of the cable elements including any exposed surfaces of the layers of the multilayer heater cable. For example, with reference to a lead sheathed cable having an outer vinyl jacket, a winding of an uncured butyl base tape is placed over the stepped surfaces of the heater cable and, when heated and compressed pursuant to this invention, the bonding of the inner surface of the fused tape winding is effected on each of these steps and is also effected on the metal band which clips the heater element of the heater cable directly onto the power lead of the poser cables. A similar bond is also established on the exposed surfaces of the conductor metal. This bonding of the metal and rubber layer surfaces serves to restore the strength diminished by the removal of outer layers from the cable structure.

Accordingly an essential feature of this method of splicing is the formation or use of an inner tape layer which is convertible by heating and compressing into a bonded flexible inner sheath. The inner rubber layer must have a bonding strength and must be used in a thickness which when enveloped within the stiff sheath bonded to the external surface of the rubber layer is sufficient to restrain appreciable flexing of the cable or of the layers of the cable essentially anywhere within the splice. The inner layer of semi-vulcanized butyl rubber covers essentially all of the splice elements to be contained within the splice and can extend from the outer jacket of one cable to the outer jacket of the other cable thereby enveloping all direct leads, all grounding leads, and all insulating layers without exception.

However, the use of this layer of rubber alone or its use in conjunction with a pliable elastic outer layer is insufficient to restrain flexing of the splice area of the cable.

Superimposed over this semi-vulcanized tape is a dual layer sheath the inner layer of which is a fusible polyolefin and the outer layer of which is shrinkable at temperatures at which the inner layer is fusible. The tube layers may be, as for example, polyethylene or polypropylene, and are preferably a polyolefin although other combinations of polymers such as combinations of polyolefins with certain rubbers such as neoprene may be used as well.

Low, medium or high density polyethylene may be used. Also, homopolymers or copolymers of polypropylene may be used. The outer shrink tube component should be stiff relative to the butyl rubber so that the cable splice will be stiff when the tube is shrunk into place about the pliable rubber layer.

The outer layer is preferably a ployolefin and one having a much higher melting point than that of the inner tube layer. The outer tube polymer is preferably one which is electronically cross-linked. By electronically cross-linked is meant a polyolefin which has been expanded to shrink tube size and cross-linked by being subjected to treatment with beta rays or equivalent cross-linking treatment. The two layer tube is essentially a shrink tube having an outer non-fusible shrinkable layer of polyolefin and an inner fusible layer of polyolefin so that when the tube is heated to shrink it into place the outer layer does the shrinking and the inner layer is fused by the same heat applied in shrinking the outer tube.

Also, and in combination with this heating and shrinking and fusing, there is a fusion and partial vulcanization of the rubber layer under the high pressure exerted by the shrink tube as it shrinks into place about the rubber layer. This pressurized fusion results in the contraction or elimination of a lot of the voids in the material which are developed because of the overlap of the tape at edges and the like so that the semi-vulcanized rubber not only becomes further vulcanized but is congealed into an essentially compact mass of rubber with a low proportion of voids.

As a further effect of this heating, a stron bond develops between the meltable inner layer of the two layer shrink tube and the compatible butyl rubber. An adherance or bond can also be formed to an extent beyond the end of the butyl rubber wrapped portion of the splice directly to the vinyl or other outer insulation or sheath of the heater cable and of the power supplying cable where either the confronting surfaces are of compatible materials or where a priming agent is applied to the outer cable or inner tube surface to induce such compatibility.

Where maximum moisture proofing is sought, an essential point in the construction of this splice is that the semi-cured butyl layer, when applied as tape, must be wrapped not only over the full length of the spliced elements and the stepped layer of the cable and the various surfaces exposed by the opening up of the cables, but must extend well over a portion of the outermost layer of the cable and beyond the starting point for the removal of layers. This is essential to maximize moisture exclusion because a bond is necessary to exclude moisture and the adhesion between the semi-cured butyl tape and the outermost layer of the cable is greater than that between the shrink tube inner surface and the outer surface of the outer cable jacket. The bond itself need not be a strongly adhesive or a strongly adherent bond principally because it is used in combination with the two layer shrink tube which first compresses the butyl layer into closely conforming contact with the outer layer of the cable and also keeps the butyl layer under compressed contact with the outer layer of the cable. This compressed close contact results in part because the simultaneous heating of the shrink tube and the semi-vulcanized rubber both bonds the inner layer of the two layer shrink tube to the outer surface of the semi-cured tape wrapping and also puts the semi-cured rubber layer in compression. In other words, where the material of the outermost layer of the cable is a vinyl or other material which does not bond with the fused butyl rubber or with the fused inner layer of the shrink tube, an effective moisture barrier provided in accordance with this invention is not so much the bond between the inner meltable layer of the dual layer shrink tube and the outermost layer of either of the cables but rather is what may be termed as the "-peelable" bond between the inner surface of the butyl layer and the outer layer of the outermost insulation layer of the cable. If the splice is cut so that peeling is possible, the removal of the congealed butyl tape layer from the outer surface of the cable is feasible. However, in a splice as provided in accordance with this invention there is no opportunity for a peeling force to be generated on the butyl rubber layer to remove it from its peelable adhesive contacts with the outermost layer of the heater cable.

Another feature of the splice is the excellent heat transfer properties of the portion of an entire cable installation which could very well be expected to be a hot spot in the overall structure. A problem within heat transfer, once the original layers of material are progressively peeled back or removed in stepwise fashion from the heater cable, is that the transfer pattern is upset in a very restricted area of the splice. For example, where the layers are loosely replaced with other material so that heat trapping voids will be created in the splice. What overcomes this problem in the structure of this invention is the use of a semi-cured, semi-vulcanized butyl tape which not only undergoes further vulcanization during the heating incident to the shrinking of the tube in place but also undergoes a sufficient melting so that the compressive pressure created by the shrinking of the tube forces the molten butyl composition into all of the interstices within the splice region and essentially restrores the heat transfer path which was interrupted as the layers of cable are peeled back to expose the heater element for splicing.

Some insight into the advantages of the structure of this invention may be gained by comparing a molded structure with the splice structure of this invention, particularly with respect to the holding of the lead at its termination, i.e., the termination of the lead layer. Where this termination of the lead layer is superimposed over the cross-linked polyethylene and separated from the heater cable by the cross-linked polyethylene in other comparable structures, a molded structure being an illustrative other comparable structure, the end of the lead layer is sufficiently mobile as distinct from the immobilization in the splice of this invention so that its movement effectively cuts through the inner insulation and permits the lead to electrically contact the innermost and heater layer of the comparable structure. No such cutting of inner insulation has been observed in the splice structure of this invention partly because of the closure of the boids under the high compressive force of the hot shrink tube; partly because of the bonding of the semi-vulcanized rubber tape layer to the lead to further immobilize it; partly because of the bonding of the relatively stiff shrink tube to the outer surface of the rubber layer to add the stiffness of this tube, the walls of which are in tension, to the stiffness of the overall splice structure.

Another feature which strengthens the splice overall is the stiffening of the rubber layer due to its being placed and kept in compression by the closing of the shrink tube about it to the extent where there is no appreciable bending in the splice area and accordingly no longitudinal compression or extension of the wire at the point of electrical contact. Such bending is relative to the cable itself and is far less than the bending of the cable.

What is claimed is:

1. A heater cable splice comprising,
two cables having insulation removed from end portions of electric conductors thereof,
at least one of said conductors being a heater conductor and said conductors being spliced,
a congealed rubber layer extending over the electrically linked conductors of the cables of said splice to adjacent insulating layers of the cables of said splice,
each of the cables of said splice including a grounding braid layer and the grounding braid layer of one cable being joined to the grounding braid layer of the other cable and being overlain with a second layer of said semi-cured rubber,
an outer shrink tube shrunk into conforming contact with a congealed layer of semi-cured rubber held in radial compression,
said shrink tube having an outer shrinkable layer of a high melting point held in circumferential tension,
and said shrink tube having an inner layer of a melting point lower than that of said outer shrinkable layer,
said inner layer being bonded to said outer layer and being bonded to said rubber layer,
the inner surfaces of said congealed layer being adherent to at least some of the exposed surfaces of the cables at said splice,
and said shrink tube extending to overlay insulating layers of the cables of said splice adjacent to said congealed layer of semi-cured rubber.

2. A splice for heater cable comprising
two aligned heater cable ends,
portions of said cable ends being removed to expose inner conductive elements thereof including innermost conductive elements and outer conductive metal layers and to expose an inner insulating layer between said innermost conductive element and said outer conductive layers,
a conductive link between the innermost conductive elements of said two aligned cables,
an inner insulating layer of semi-cured congealed rubber embedding said linked conductive elements, said inner rubber layer extending to adjacent portions of inner insulating layers of said cables over said innermost conductive elements,
an outer conductive link between outer conductive metal layers overlaying said inner insulating layers,
said outer conductive layers and outer conductive link being insulated by a congealed outer layer of semi-cured rubber held in radial compression, said outer rubber layer extending over exposed portions of outer insulating layers of said cables
and an outer shrink tube shrunk into conforming contact with said congealed semi-cured rubber.

3. The splice of claim 2 wherein the shrink tube extends to cover portions of the outer insulating layers of the respective cables of said splice.

* * * * *